United States Patent
Melcher et al.

(10) Patent No.: US 10,169,801 B2
(45) Date of Patent: Jan. 1, 2019

(54) SYSTEM AND METHOD FOR SUPPLEMENTING AN IMAGE GALLERY WITH STATUS INDICATORS

(71) Applicant: eBay Inc., San Jose, CA (US)

(72) Inventors: Ryan Melcher, Ben Lomond, CA (US); Dane Howard, Los Gatos, CA (US)

(73) Assignee: eBay Inc., San Jose, CA (US)

( * ) Notice: Subject to any disclaimer, the term of this patent is extended or adjusted under 35 U.S.C. 154(b) by 102 days.

(21) Appl. No.: 15/210,415

(22) Filed: Jul. 14, 2016

(65) Prior Publication Data

US 2016/0321731 A1      Nov. 3, 2016

Related U.S. Application Data

(63) Continuation of application No. 12/559,395, filed on Sep. 14, 2009, now Pat. No. 9,406,042.

(60) Provisional application No. 61/155,095, filed on Feb. 24, 2009.

(51) Int. Cl.
| | |
|---|---|
| *G06Q 30/06* | (2012.01) |
| *G06Q 10/10* | (2012.01) |
| *G06Q 30/08* | (2012.01) |
| *G06Q 30/02* | (2012.01) |
| *H04L 29/08* | (2006.01) |

(52) U.S. Cl.
CPC ......... *G06Q 30/0627* (2013.01); *G06Q 10/10* (2013.01); *G06Q 30/06* (2013.01); *G06Q 30/0603* (2013.01); *G06Q 30/08* (2013.01); *G06Q 30/0275* (2013.01); *H04L 67/36* (2013.01)

(58) Field of Classification Search
CPC ........... G06Q 30/0627; G06Q 30/0603; G06Q 30/08; G06Q 30/02; G06Q 30/06; G06Q 30/0275; G06Q 30/0601; G06Q 30/0611
USPC ..... 705/14.71, 26.1, 26.2, 26.3, 26.35, 26.4, 705/27.1, 27.2, 37, 400; 715/204, 738, 715/751, 760, 810, 838, 864
See application file for complete search history.

(56) References Cited

U.S. PATENT DOCUMENTS

| | | | |
|---|---|---|---|
| 5,579,472 | A | 11/1996 | Keyworth, II et al. |
| 9,406,042 | B2 | 8/2016 | Melcher et al. |
| 2001/0029465 | A1 | 10/2001 | Strisower |
| 2002/0133446 | A1 | 9/2002 | Lee |

(Continued)

OTHER PUBLICATIONS

"U.S. Appl. No. 12/559,395, Final Office Action dated May 14, 2014", 19 pgs.

(Continued)

*Primary Examiner* — Rinna Yi
(74) *Attorney, Agent, or Firm* — Wolfe-SMBC (57) ABSTRACT

In various example embodiments, a system and method to provide status indictors on an image galley is disclosed. At least one item to be displayed in an image gallery on a client device is identified. Once identified, status information for the item is obtained. Subsequently, gallery rendering and display instructions are generated and transmitted to the client device. The rendering and display instructions include the status information and enables generation of status indicators from the status information for display over the image gallery at the client device. The rendering and display instructions may also include instructions for displaying the image gallery. The status information at the client device may be updated as status information changes.

20 Claims, 9 Drawing Sheets

(56) References Cited

U.S. PATENT DOCUMENTS

| | | | |
|---|---|---|---|
| 2003/0220867 A1 | 11/2003 | Goodwin et al. | |
| 2003/0236752 A1 | 12/2003 | Dawson et al. | |
| 2005/0004990 A1 | 1/2005 | Durazo et al. | |
| 2005/0131799 A1 | 6/2005 | Clay et al. | |
| 2006/0069623 A1* | 3/2006 | MacDonald Korth | G06Q 30/0601 705/26.1 |
| 2006/0101131 A1 | 5/2006 | Hess et al. | |
| 2007/0022020 A1 | 1/2007 | Bernstein | |
| 2007/0219712 A1 | 9/2007 | Abhyanker | |
| 2007/0233854 A1 | 10/2007 | Bukovec et al. | |
| 2008/0077597 A1 | 3/2008 | Butler | |
| 2008/0154898 A1 | 6/2008 | Cheng et al. | |
| 2008/0184157 A1 | 7/2008 | Selig | |
| 2008/0255962 A1 | 10/2008 | Chang | |
| 2009/0094260 A1* | 4/2009 | Cheng | G06Q 30/02 |
| 2009/0176482 A1 | 7/2009 | Martin et al. | |
| 2009/0235187 A1 | 9/2009 | Kim et al. | |
| 2009/0307219 A1 | 12/2009 | Bennett | |
| 2010/0214302 A1 | 8/2010 | Melcher et al. | |

OTHER PUBLICATIONS

"U.S. Appl. No. 12/559,395, Final Office Action dated Aug. 29, 2012", 18 pgs.

"U.S. Appl. No. 12/559,395, Final Office Action dated Nov. 30, 2011", 12 pgs.

"U.S. Appl. No. 12/559,395, Non Final Office Action dated Apr. 30, 2012", 15 pgs.

"U.S. Appl. No. 12/559,395, Non Final Office Action dated Aug. 5, 2011", 13 pgs.

"U.S. Appl. No. 12/559,395, Non Final Office Action dated Sep. 14, 2015", 30 pgs.

"U.S. Appl. No. 12/559,395, Non Final Office Action dated Nov. 8, 2013", 21 pgs.

"U.S. Appl. No. 12/559,395, Non Final Office Action dated Dec. 26, 2014", 27 pgs.

"U.S. Appl. No. 12/559,395, Notice of Allowance dated Mar. 31, 2016", 17 pgs.

"U.S. Appl. No. 12/559,395, Response filed Feb. 10, 2014 to Non Final Office Action dated Nov. 8, 2013", 13 pgs.

"U.S. Appl. No. 12/559,395, Response filed Feb. 27, 2012 to Finaal Office Action dated Nov. 30, 2011", 11 pgs.

"U.S. Appl. No. 12/559,395, Response filed Apr. 20, 2015 to Non Final Office Action dated Dec. 26, 2014", 17 pgs.

"U.S. Appl. No. 12/559,395, Response filed Jul. 30, 2012 to Non-Final Office Action dated Apr. 30, 2012", 12 pgs.

"U.S. Appl. No. 12/559,395, Response filed Sep. 15, 2014 to Non Final Office Action dated May 14, 2014", 14 pgs.

"U.S. Appl. No. 12/559,395, Response filed Nov. 7, 2011 to Non-Final Office Action dated Aug. 5, 2011", 12 pgs.

"U.S. Appl. No. 12/559,395, Response filed Nov. 28, 2012 to Final Office Action dated Aug. 29, 2012", 12 pgs.

"U.S. Appl. No. 12/559,395, Response filed Dec. 14, 2015 to Non Final Office Action dated Sep. 14, 2015", 15 pgs.

"Screenshoots—Swoopo Review", [Online]. Retrieved from the Internet: <https://www.youtube.com/watch?v=TdttRVrWOvw>, (Jan. 2009), 1 pg.

Taylor, Dave, "How do I avoid snipers on my eBay auctions?", [Online], Retrieved from the Internet: <http://www.askdavetaylor.com/avoid_snipers_on_ebay_auctions/>, (Sep. 2006), 9 pgs.

\* cited by examiner

SYSTEM AND METHOD FOR SUPPLEMENTING AN IMAGE GALLERY WITH STATUS INDICATORS

RELATED APPLICATIONS

This application is a continuation of U.S. patent application Ser. No. 12/559,395, filed on Sep. 14, 2009, which application claims the priority benefit of U.S. Provisional Application Ser. No. 61/155,095, filed on Feb. 24, 2009, which applications are incorporated herein by reference in their entireties.

FIELD

The present disclosure relates generally to information retrieval, and in a specific example embodiment, to supplementing an image gallery with status indicators.

BACKGROUND

Websites provide a number of publishing, listing, and price-setting mechanisms whereby a seller may list or publish information concerning items for sale. A buyer, as well as the seller, typically is interested in monitoring items of interest. For example, the seller may want to track the status of the items that seller is attempting to sell. In contrast, the buyer may desire to search for, or track, items the buyer is interested in acquiring or, in the case of an auction, items on which the buyer has placed a bid.

Conventionally, the buyer or seller accesses a list of items. In some cases, the list comprises items the buyer has purchased, is currently bidding on, has searched for previously, or is watching for possible future purchase. For sellers, the list may comprise items that the seller has offered for sale and current prices. These lists are generally displayed in a scroll through embodiment (e.g., on a webpage whereby the user may scroll down the page to view the various listings) whereby the user needs to select (e.g., click-through) a particular item from the list in order to view more detailed information regarding the status of the item. For small, mobile devices, such lists are often difficult to view and navigate.

BRIEF DESCRIPTION OF DRAWINGS

Various ones of the appended drawings merely illustrate example embodiments of the present invention and cannot be considered as limiting its scope.

DETAILED DESCRIPTION

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

As used herein, the term "or" may be construed in either an inclusive or exclusive sense. Additionally, although various example embodiments discussed below focus on a network-based publication environment, the embodiments are given merely for clarity in disclosure. Thus, any type of electronic publication, electronic commerce, or electronic business system and method, including various system architectures, may employ various embodiments of the status indicator display system and method described herein and is considered as being within a scope of example embodiments. Each of a variety of example embodiments is discussed in detail, below.

Example embodiments described herein provide systems and methods to provide status indictors on an image galley. At least one item to be displayed in an image gallery on a client device is identified. Once identified, status information for the at least one item is obtain. In example embodiments, the status information may be obtained from the image catalog, from a database of currently available items, or any other source of information. Subsequently, gallery rendering and display instructions are generated and transmitted to the client device. The rendering and display instructions include the status information and enables generation of status indicators from the status information for display over the image gallery at the client device. The rendering and display instructions may also include instructions for displaying the image gallery.

The status information at the client device may be updated. In some embodiments, status information is determined and transmitted at a predetermined time or based on a triggering event. In other embodiments, a status update request may be received from the client device.

Figure 1:
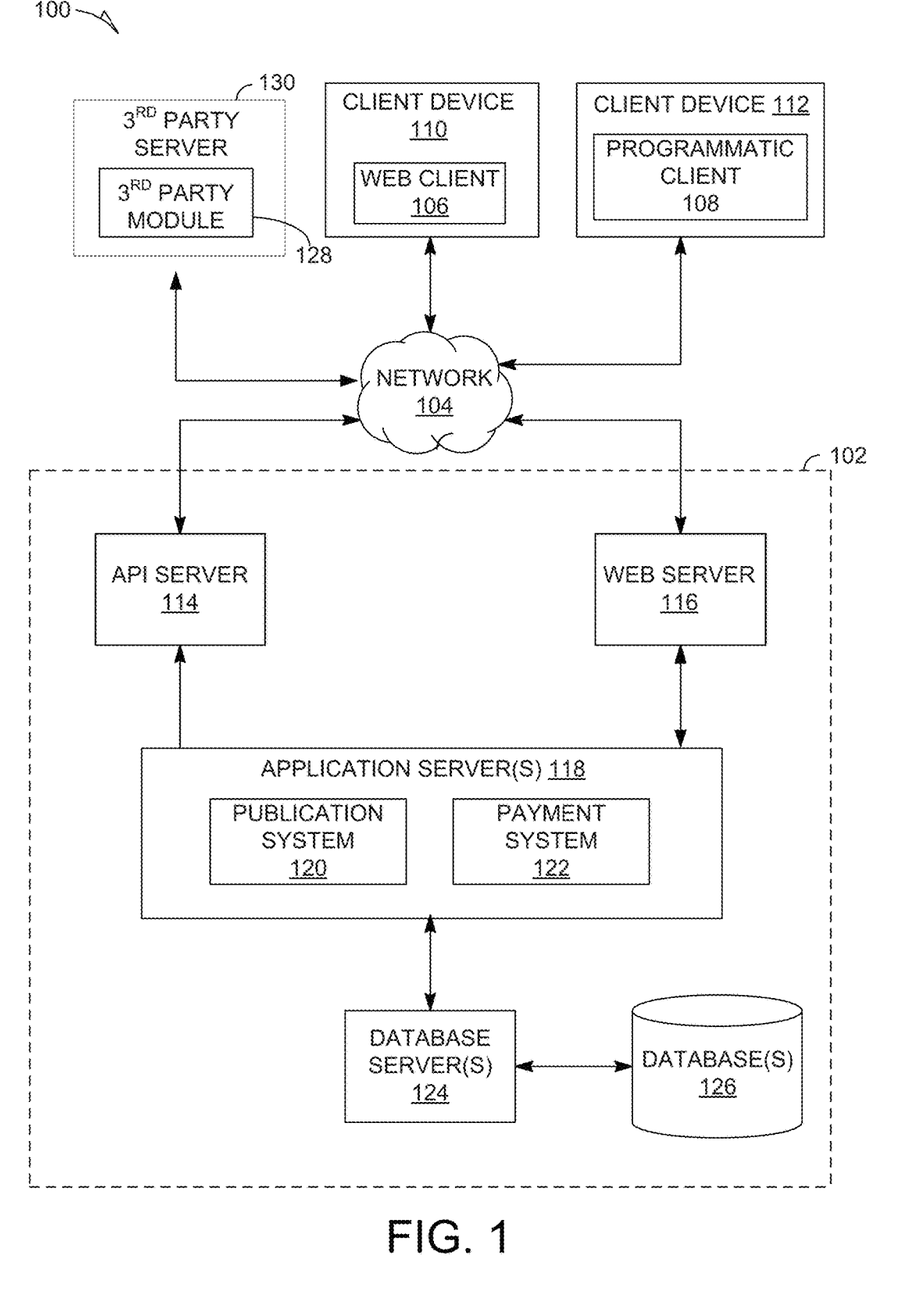
FIG. 1 is a block diagram illustrating an example embodiment of a network architecture of a system used to identify items depicted in images.

With reference to FIG. 1, an example embodiment of a high-level client-server-based network architecture 100 for providing targeted merchandising to returning user is shown. A networked system 102, in an example form of a network-server-side functionality, is coupled via a network 104 (e.g., the Internet or Wide Area Network (WAN)) to one or more clients. FIG. 1 illustrates, for example, a web client 106 operating via a browse e.g., such as the Internet Explorer® browser developed by Microsoft® Corporation of Redmond, Wash. State), and a programmatic client 108 executing on respective client devices 110 and 112. The client devices 110 and 112 may comprise a mobile phone, desktop computer, laptop, or any other communication device that a user may utilize to access the networked system 102.

An Application Program Interface (API) server 114 and a web server 116 are coupled to, and provide programmatic and web interfaces respectively to, one or more application servers 118. The application servers 118 host a publication system 120 and a payment system 122, which may comprise one or more modules, applications, or engines, each of which may be embodied as hardware, software, firmware, or any combination thereof. The application servers 118 are, in turn, coupled to one or more database servers 124 facilitating access to one or more information storage repositories or database(s) 126.

The storage databases 126 may store information regarding items presented on the networked system 102. For example, the items may comprise items for sale or auction via the publication system 120. The information stored may include images, current prices, start and end time for an auction, seller's information, or any other information relevant to the item.

The publication system 120 provides a number of publication and marketplace functions and services to users that access the networked system 102. The publication system 120 is discussed in more detail in connection with FIG. 2.

The payment system 122 provides a number of payment services and functions to users. The payment system 122 allows users to accumulate value (e.g., in a commercial currency, such as the U.S. dollar, or a proprietary currency, such as "points") in accounts, and then later to redeem the accumulated value for products (i.e., goods or services) that are made available via the publication system 120. The payment system 122 also facilitates payments from a payment mechanism (e.g., a bank account or credit card) for purchases of items via the network-based marketplace. While the publication system 120 and the payment system 122 are shown in FIG. 1 to both form part of the networked system 102, it will be appreciated that, in alternative embodiments, the payment system 122 may form part of a payment service that is separate and distinct from the networked system 102.

FIG. 1 also illustrates a third party module 128, executing on a third party server 130, as having programmatic access through the network 104 to the networked system 102 via the programmatic interface provided by the API server 114. For example, the third party module 128 may, utilizing information retrieved from the networked system 102, support one or more features or functions on a website (not shown) hosted by the third party. The third party website may, for example, provide one or more promotional, marketplace, or payment functions that are supported by the relevant applications of the networked system 102.

In some embodiments, the client device (e.g., client device 110) captures and transmits an image of an item of interest to the networked system 102. The image may be captured by a camera built into the client device 110 or by a digital camera, which is configurable to download its stored images to the client device 110. In some cases, the image may be a representation of the item of interest (e.g., barcode for the item). Alternatively, the user may locate the image through, for example, the Internet or other image repositories (e.g., using the browser). Additionally, the client device 110 may capture a verbal description of the item of interest. Images (both captured and obtained from other sources) and verbal descriptions are herein collectively referred to as image data.

While the example network architecture 100 of FIG. 1 employs a client-server architecture, a skilled artisan will recognize that the present disclosure is not limited to such an architecture. The example network architecture 100 can equally well find application in, for example, a distributed or peer-to-peer architecture system. The publication system 120 and payment system 122 may also be implemented as standalone systems or standalone software programs operating under separate hardware platforms, which do not necessarily have networking capabilities.

Figure 2:
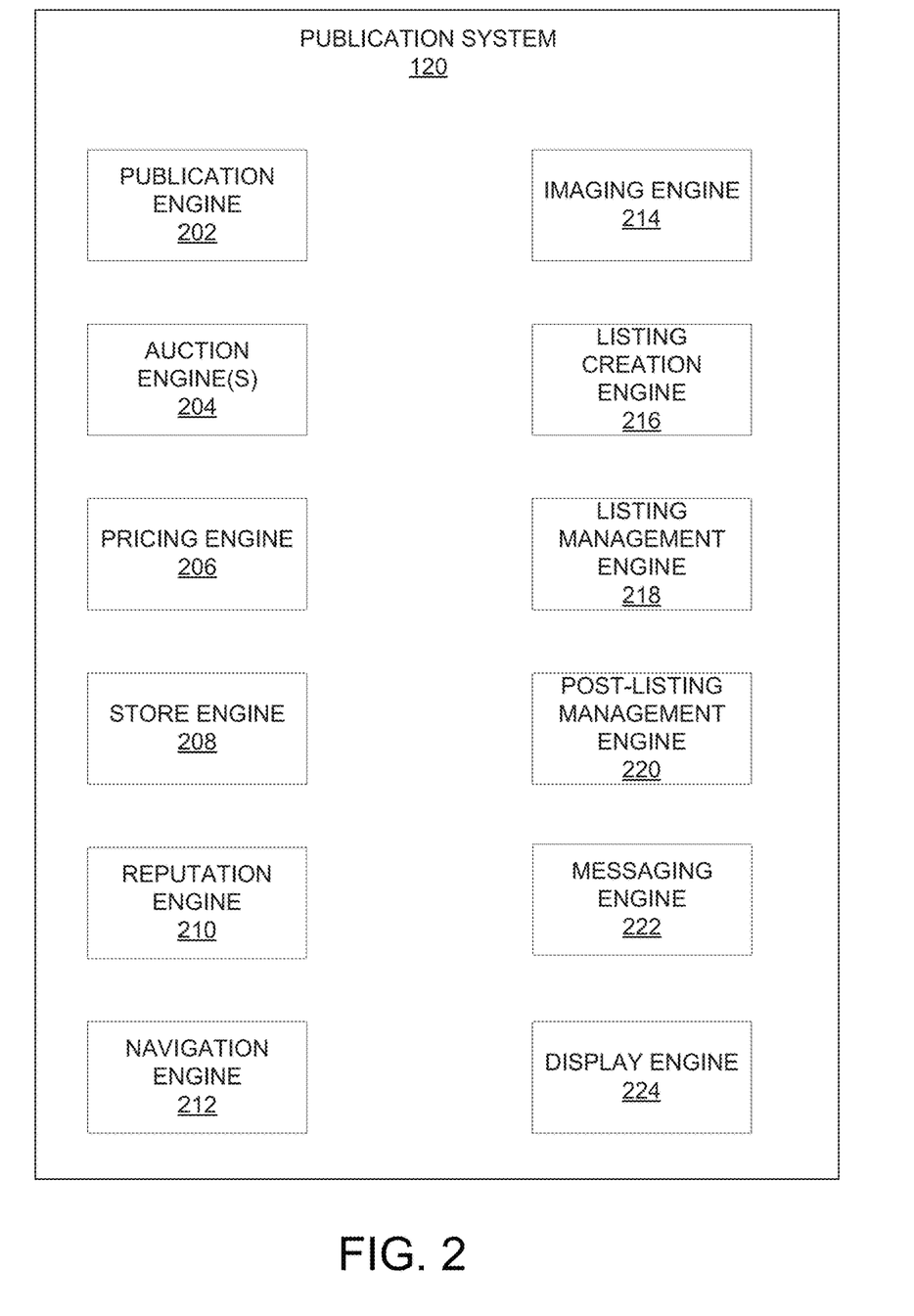
FIG. 2 is a block diagram illustrating an example embodiment of a publication system.

Referring now to FIG. 2, an example block diagram illustrating multiple components that, in one example embodiment, are provided within the publication system 120 of the networked system 102 (see FIG. 1) is shown. The publication system 120 may be hosted on dedicated or shared server machines (not shown) that are communicatively coupled to enable communications between the server machines. The multiple components themselves are communicatively coupled (e.g., via appropriate interfaces), either directly or indirectly, to each other and to various data sources, to allow information to be passed between the components or to allow the components to share and access common data. Furthermore, the components may access the one or more database(s) 126 via the one or more database servers 124, both shown in FIG. 1.

The networked system 102 provides a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the publication system 120 may comprise at least one publication engine 202 and one or more auction engines 204 that support auction-format listing and price setting mechanisms (e.g., English, Dutch, Chinese, Double, Reverse auctions, etc.). The various auction engines 204 also provide a number of features in support of these auction-format listings, such as a reserve price feature whereby a seller may specify a reserve price in connection with a liking and a proxy-bidding feature whereby a bidder may invoke automated proxy bidding.

A pricing engine 206 supports various price listing formats. One such format is a fixed-price listing format (e.g., the traditional classified advertisement-type listing or a catalogue listing). Another format comprises a buyout-type listing. Buyout-type listings (e.g., the Buy-It-Now (BIN) technology developed by eBay Inc., of San Jose, Calif.) may be offered in conjunction with auction-format listings and allow a buyer to purchase goods or services, which are also being offered for sale via an auction, for a fixed-price that is typically higher than a starting price of an auction for an item.

A store engine 208 allows a seller to group listings within a "virtual" store, which may be branded and otherwise personalized by and for the seller. Such a virtual store may also offer promotions, incentives, and features that are specific and personalized to the seller. In one example, the seller may offer a plurality of items as Buy-It-Now items in the virtual store, offer a plurality of items for auction, or a combination of both.

A reputation engine 210 allows users that transact, utilizing the networked system 102, to establish, build, and maintain reputations. These reputations may be made available and published to potential trading partners. Because the networked system 102 supports person-to-person trading between unknown entities, users may otherwise have no history or other reference information whereby the trustworthiness and credibility of potential trading partners may be assessed. The reputation engine 210 allows a user, for example through feedback provided by one or more other transaction partners, to establish a reputation within the networked system 102 over time. Other potential trading partners may then reference the reputation for purposes of assessing credibility and trustworthiness.

Navigation of the network-based publication system may be facilitated by a navigation engine 212. For example, a search module (not shown) of the navigation engine 212 enables keyword searches of listings published via the publication system 120. In a further example, a browse module (not shown) of the navigation engine 212 allows users to browse various category, catalogue, or inventory data structures according to which listings may be classified within the publication system 120. Various other navigation applications within the navigation engine 212 may be provided to supplement the searching and browsing applications.

In order to make listings available via the networked system 102 as visually informing and attractive as possible, the publication system 120 may include an imaging engine 214 that enables users to upload images for inclusion within listings and to incorporate images within viewed listings. The imaging engine 214 also receives image data from a user and utilizes the image data to identify an item depicted or described by the image data. The imaging engine 214 will be discussed in more detail in connection with FIG. 3, below.

A listing creation engine 216 allows sellers to conveniently author listings pertaining to goods or services that sellers wish to transact via the networked system 102, while a listing management engine 218 allows sellers to manage such listings. Specifically, where a particular seller has authored or published a large number of listings, the management of such listings may present a challenge. The listing management engine 218 provides a number of features (e.g., auto-relisting, inventory level monitors, etc.) to assist the seller in managing such listings.

A post-listing management engine 220 also assists sellers with a number of activities that typically occur post-listing. For example, upon completion of an auction facilitated by the one or more auction engines 204, a seller may wish to leave feedback regarding a particular buyer. To this end, the post-listing management engine 220 provides an interface to the reputation engine 210 allowing the seller to conveniently provide feedback regarding multiple buyers to the reputation engine 210.

A messaging engine 222 is responsible for the generation and delivery of messages to users of the networked system 102. Such messages include, for example, advising users regarding the status of listings and best offers (e.g., providing an acceptance notice to a buyer who made a best offer to a seller). The messaging engine 222 may utilize any one of a number of message delivery networks and platforms to deliver messages to users. For example, the messaging engine 222 may deliver electronic mail (e-mail), an instant message (IM), a Short Message Service (SMS), text, facsimile, or voice (e.g., Voice over IP (VoIP)) messages via wired networks (e.g., the Internet), a Plain Old Telephone Service (POTS) network, or wireless networks (e.g., mobile, cellular, Win, WiMAX).

A display engine 224 manages data associated with image galleries. In example embodiments, the display engine 224 obtains and formats data for image galleries and transmits the formatted data to a requesting client device. The display engine 224 also manages status information for image galleries. The display engine 224 will be discussed in more detail in connection with FIG. 4.

Although the various components of the publication system 120 have been defined in terms of a variety of individual modules and engines, a skilled artisan will recognize that many of the items can be combined or organized in other ways. Furthermore, not all components of the publication system 120 have been included in FIG. 2. In general, components, protocols, structures, and techniques not directly related to functions of example embodiments (e.g., dispute resolution engine, loyalty promotion engine, personalization engines, etc.) have not been shown or discussed in detail. The description given herein simply provides a variety of example embodiments to aid the reader in an understanding of the systems and methods used herein.

Figure 3:
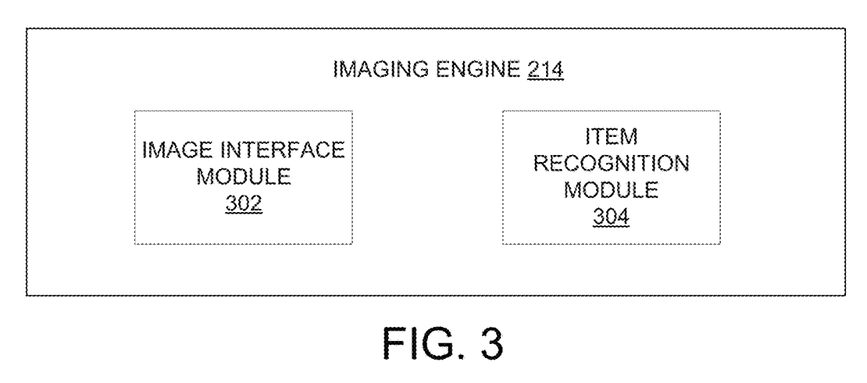
FIG. 3 is a block diagram illustrating an example embodiment of an imaging engine.

Application of Embodiments of the Status Indicator Platform into the Example Network Architecture Referring now to FIG. 3, an example diagram of the imaging engine 214 is shown. The imaging engine 214, in conjunction with the display engine 224, provides mechanisms for enabling a client device to display an image gallery comprising status indictors.

In example embodiments, the imaging engine 214 comprises an imaging interface module 302 and an item recognition module 304. Alternative embodiments may comprise further components or modules not directly related to example embodiments of the present invention, and thus are not shown or discussed. Furthermore, some of the components of the imaging engine 214 may be located elsewhere (e.g., in the display engine 224) or be located at the client device.

The imaging interface module 302 provides a graphical user interface for user interaction with the various modules of the imaging engine 214 and display engine 224. In example embodiments, the graphical user interface allows the user to upload image data for use in searching for similar items as is discussed in more detail below.

The item recognition module 304 is configured to identify the item depicted by the image data. In one embodiment, components of the item recognition module 304 compare the image data to a catalog of items. The catalog may be organized as a matrix of data including a plurality of attributes associated with each item. For example, each item in the catalog may comprise an image, title, subtitle, category, sub-category, related item listings, average price, quantities of the item currently available, templates associated with the items, and any other data that may describe and distinguish the item from other items in the catalog. The catalog is a dynamic catalog. That is, as new items are listed or become known to the networked system 102, the new items will be added to the catalog. In one embodiment, the catalog may be stored in the database 126.

Thus, the uploaded image data may be compared against a collection of catalog image data within the catalog to determine one or more similar items. The collection of catalog image data may be user-provided or obtained from various public or commercial sources. The item recognition module 304 may use various recognition techniques, described in further detail below, to identify the item depicted by the uploaded image data.

Figure 4:
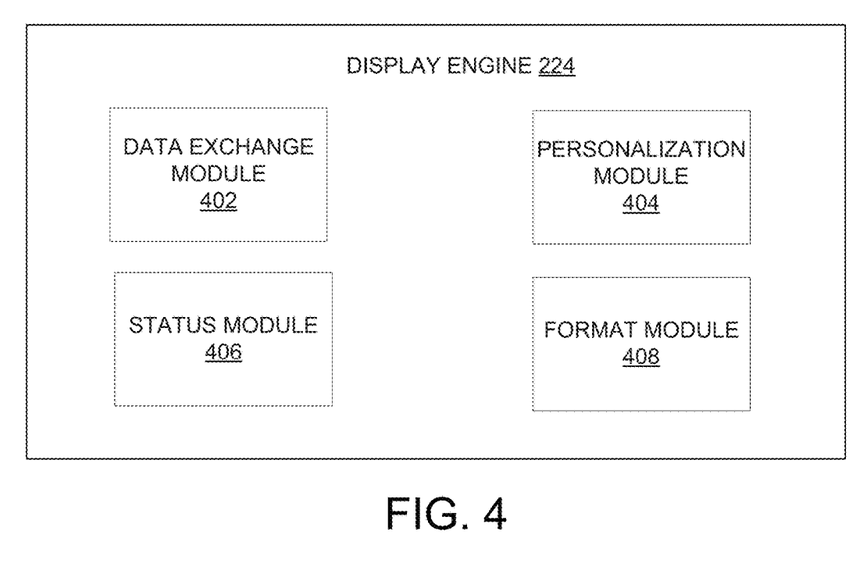
FIG. 4 is a block diagram illustrating an example embodiment of a display engine.

FIG. 4 illustrates an embodiment of the display engine 224. The display engine 224 comprises a data exchange module 402, a personalization module 404, a status module 406, and a format module 408. Alternative embodiments may comprise further components or modules not directly related to example embodiments of the image gallery status indicator system, and thus are not shown or discussed.

Furthermore, some of the components of the display engine 224 may be located elsewhere (e.g., in the imaging engine 214), be located at the client device, or be combined into a single module.

The data exchange module 402 exchanges data with the client device. In example embodiments the data exchange module 402 receives and processes a gallery view indicator from the client device. The data exchange module 402 may also receive a status update request from the client device. In response, the data exchange module 402 provides the updated status information to the client device.

The personalization module 404 determines specific items of the image gallery for each user associated with the client device. In some embodiments, the personalization module 404 knows the identity of the user (e.g., the user logs in with the networked system 102). Using the identity, the personalization module 404 accesses the user's account and determines the items that are associated with the user's account. The items may be associated in various ways. For example, the user may have a list of one or more items the user is bidding on, watching, or selling.

Additionally, the user's account may indicate one or more favorite merchants or past purchased items. In one embodiment, the personalization module 404 may determine items associated with the one or more favorite merchants. In another embodiment, the personalization module 404 may determine items similar to previously purchased items (e.g., accessories or upgraded versions).

Furthermore, the personalization module 404 may obtain results of an item query sent by the user. In some embodiments, the item query is performed by the item recognition module 304. For example, image data is received from the user and the item recognition module 304 determines one or more similar items. These one or more similar items may then be returned to the personalization module 404. In other embodiments, an item query is performed by a search module (not shown) of the publication system 120 based on keywords. In yet other embodiments, the item query is performed by the navigation engine 212 whereby items are determined by navigating down categories of items or inventory data structures.

The status module 406 determines the status of the items associated with the user's image gallery. Once the items are determined by the personalization module 404, status information may be accessed by the status module 406. Status may include whether the item is recognized (e.g., in the client device's photo album or otherwise known to the user), being sold, sold, won, did not win, is most watched, is being watched, is locally in stock near the user, is popular, has a number of bids, requires feedback to be left, is from a favorite seller, or any other information that the user may find useful.

In some embodiments, the status module 406 may monitor items associated with a user for status updates. In some cases, an event may trigger an update to the status. For example, a higher bid on an auction item that the user had previously bid on may trigger an update such that the status indicator on the image gallery will now show that the user is no longer the highest bidder. In other cases, the status module 406 may update status at a predetermined time (e.g., every five hours). In one embodiment, preferences for status update monitoring for a user may be maintained by the status module 406, the personalization module 404, or another module/engine of the networked system 102.

The format module 408 formats the status information for transmission to the client device. In example embodiments, the format module generates rendering and display instructions including the status information. The rendering and display instructions enables generation of status indicators from the status information for display over the image gallery at the client device. The rendering and display instruction may also include instructions for rendering and displaying the image gallery.

In some embodiments, the rendering and display instructions converts, or provides instructions to convert, the status information into visually identifiable graphics that represent the status information. For example, a green check mark may indicate an item that is recognized by the client device; a dollar sign indicates an item the user is selling; a coupon graphic indicates the item is on sale, discounted, or is the deal of the day. A border around an image representing an item within the image gallery may also be displayed in different colors, which represent different status. For example, a blue border around the image may indicate that the item is one that belongs to the user (e.g., the user is selling); a red border around an image may indicate that the user did not win the auction; a yellow border around an image may indicate that the user is watching the item. It should be noted that any color border or visually identifiable graphic may be used to indicate any status associated with the item in the image.

Figure 5:
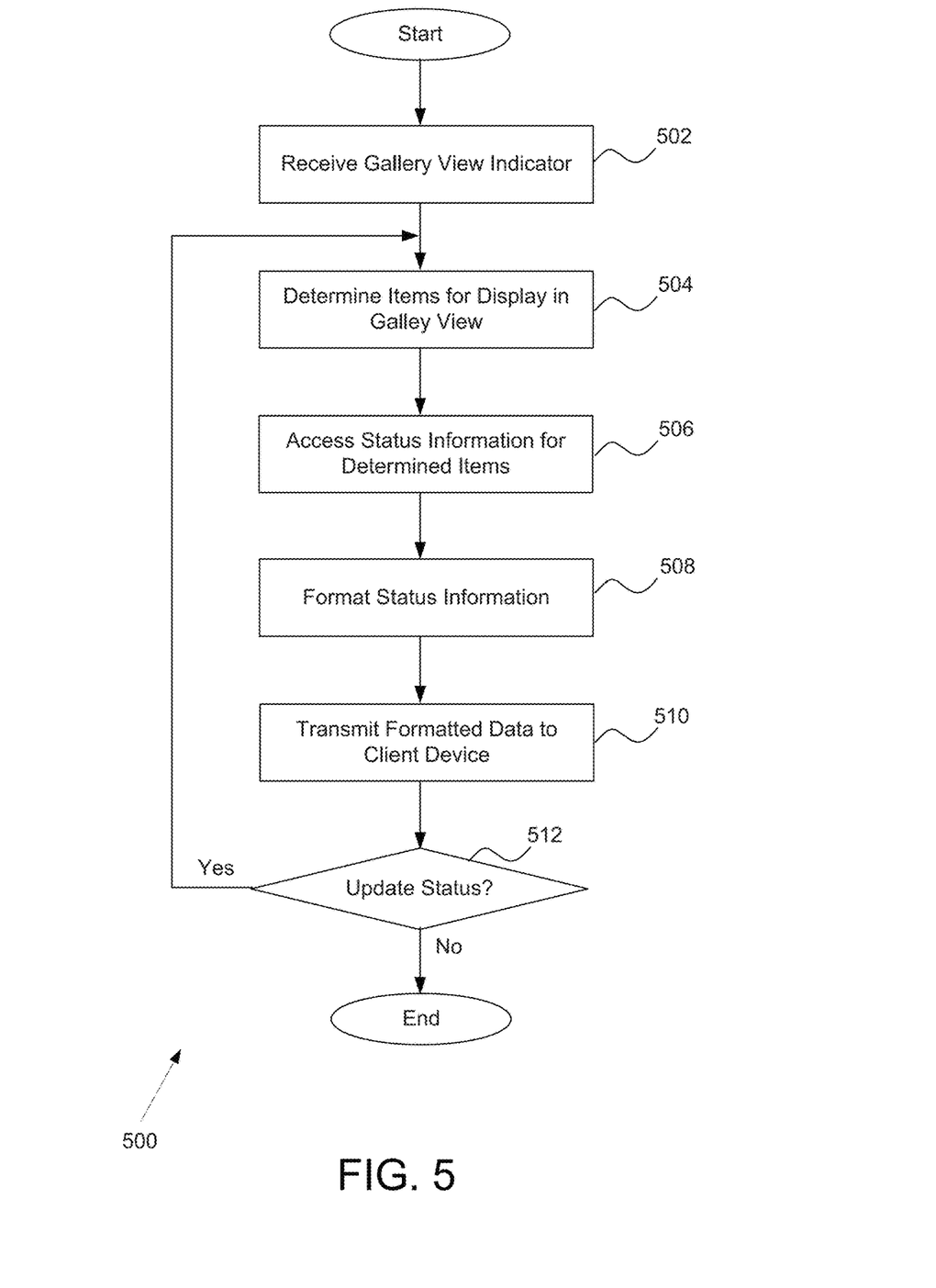
FIG. 5 is a flow diagram of an example method for providing status indicators on an image gallery.

Referring now to FIG. 5, a flow diagram of an example method 500 for providing status indicators on an image gallery is shown. The operations of the example method 500 occur at one or more application servers 118 hosting a publication system 120. At operation 502, a gallery view indicator is received from a client device. In example embodiments, the data exchange module 402 may receive the gallery view indicator. In one example, a user at the client device may have performed a search, and the results of the search may be displayed in a list view. The user may then indicate a desire to view the results in a galley view.

At operation 504, items for display in the gallery view are determined. In example embodiments, the personalization module 404 will determine the items. For example, a search may be performed for items. The returned items in the search result list are identified for display in the gallery view. In another example, the identity of the user is determined and the user's account is accessed. Items found in one or more lists associated with the user's account may be selected for display in the gallery view. In some embodiment, operation 502 and 504 may be combined or operation 504 may occur prior to operation 502 (e.g., search results determine the items and a gallery view indicator may then be received).

Status information for the determined items is accessed at operation 506. In some embodiments, the status information may be stored in an item catalog of the networked system 102. In other embodiments, status information may be obtained from a database of currently and recently available items offered on the networked system 102. For example, the status information may be obtained from all current item listings (e.g., stored in a database) of a network-based publication environment. In example embodiments, the status module 406 may obtain the status information from anywhere in the networked system 102 or from any database coupled to the networked system 102.

The status information is then formatted at operation 508. In example embodiments, the format module 408 formats the status information into gallery rendering and display instructions. The rendering and display instructions enables generation of status indicators from the status information for display over the image gallery at the client device. In some embodiments, the rendering and display instructions converts, or provides instructions to convert, the status information into visually identifiable graphics (e.g., status indicators) that represent the status information. The formatted data is then transmitted to the client device at operation 510.

Subsequently, a determination is made at operation 512 as to whether status should be updated at the client device. A status update may occur for several reasons. In one embodiment, a status update request may be received from the client device. In another embodiment, an event may trigger an update to the status (e.g., an item searched for and not initially found gets posted overnight). In a further embodiment, the status module 406 may update status at a predetermined time (e.g., every five hours).

Figure 6:
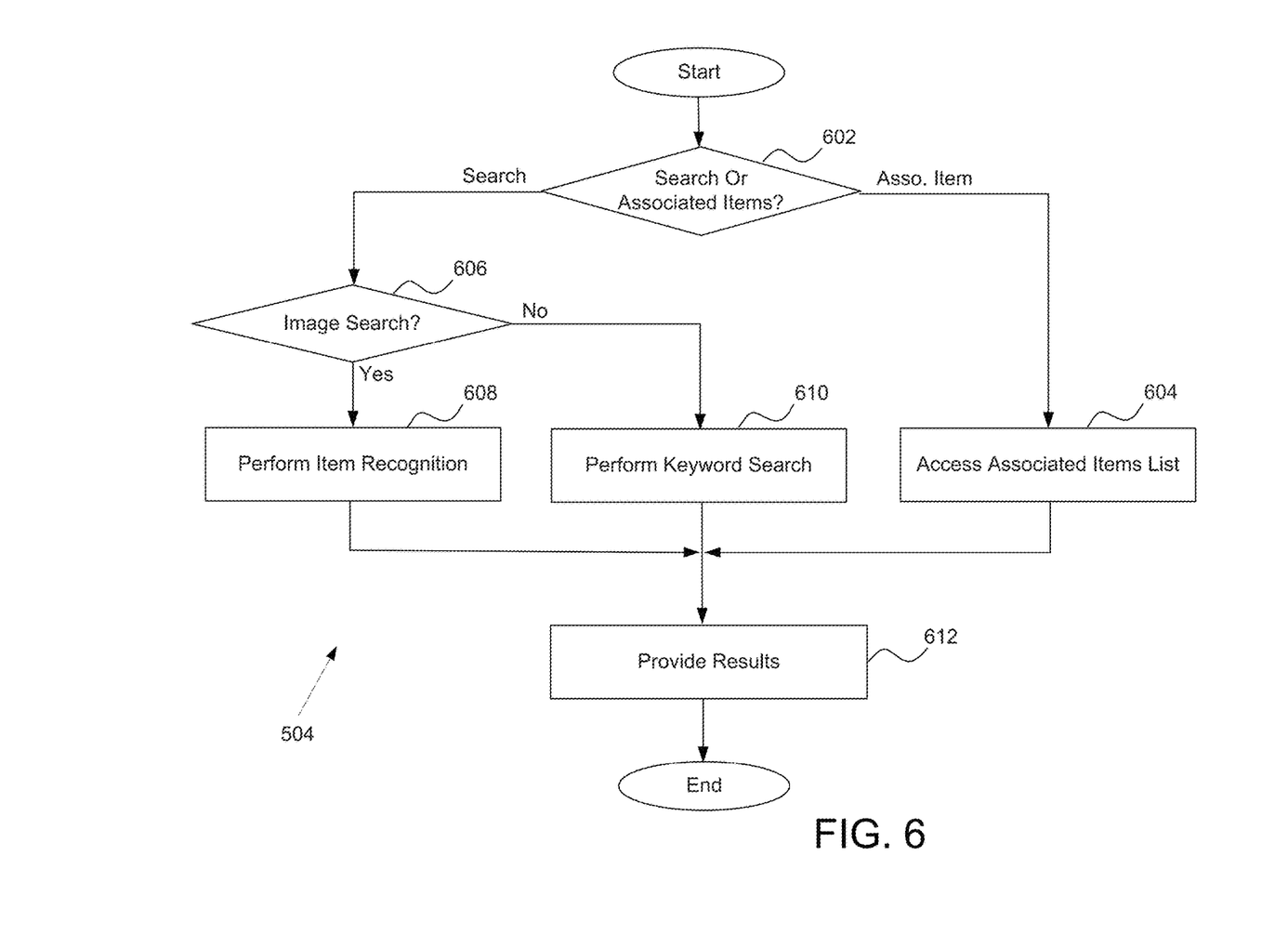
FIG. 6 is a flow diagram of an example method for determining items to display in the image gallery.

FIG. 6 is a flow diagram of an example method (e.g., operation 504) for determining one or more items to display in the image gallery. At operation 602, a determination is made as to whether the items are already associated with the user or whether the items are being searched for. If the items are already associated with the user, then one or more associated item lists are accessed at operation 604. In one embodiment, the identity of the user is determined and the user's account is accessed. Items found in one or more lists associated with the user's account may then be selected for display in the image gallery.

If the determination is based on a search, then a further determination is made at operation 606 as to whether the search is an image data search. If the search is an image data search, then at operation 608, an item recognition process is performed. In one embodiment, components of the item recognition module 304 compare the image data received from the user to a catalog of items. The catalog may be organized as a matrix of data including a plurality of attributes associated with each item. Thus, for example, the received image data may be compared against a collection of catalog image data within the catalog to determine one or more similar items.

If the search is a non-image search, then a keyword search is performed at operation 610. In example embodiments, a search query including one or more keywords is received from the user. A search module/engine (not shown) of the networked system 102 then searches for items containing the one or more keywords. It should be noted that another non-image search query may be performed by the navigation engine 212 whereby items are determined by navigating down categories of items or inventory data structures.

The results of the search or the results from the associated items list are returned as results in operation 612. Subsequently, status information may be determined for the items.

Figure 7:
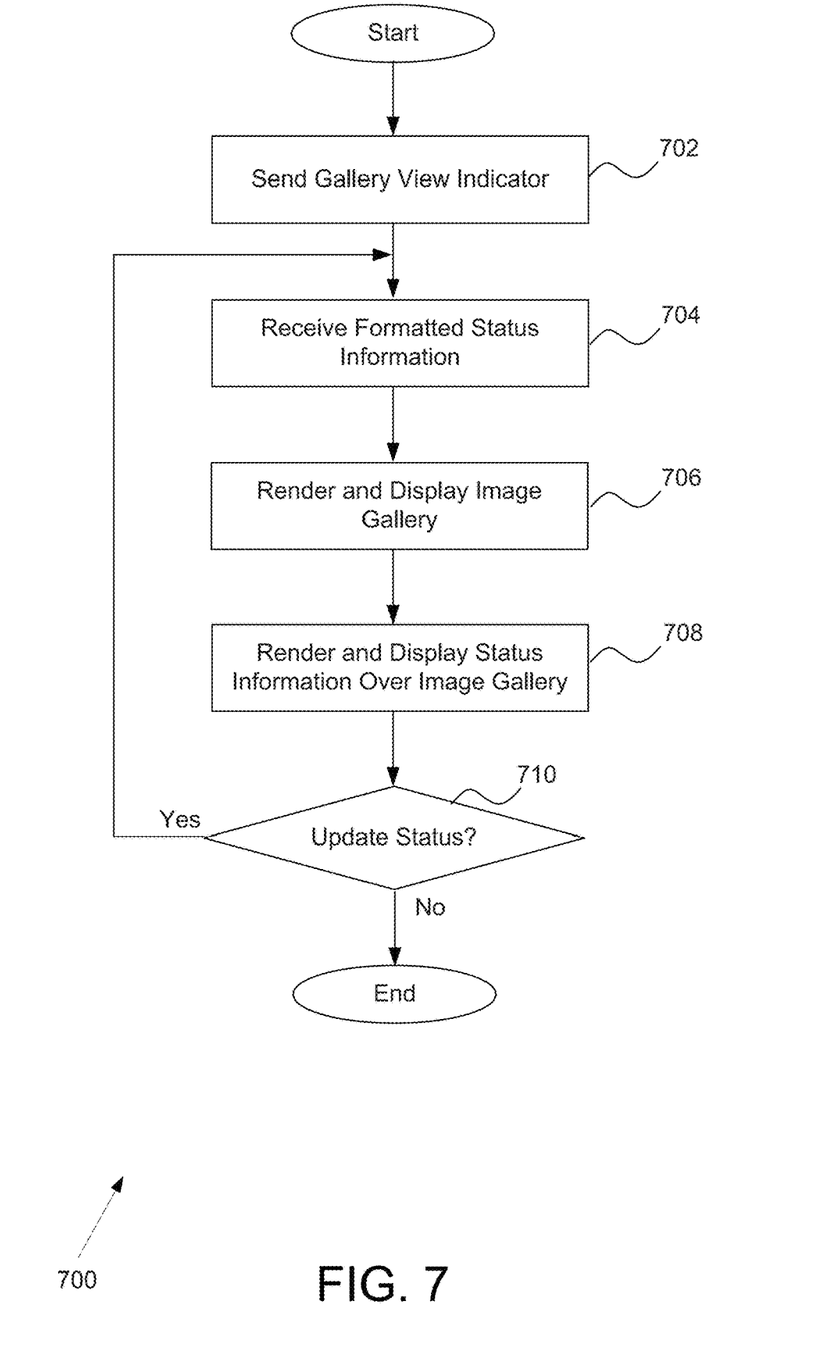
FIG. 7 is a flow diagram of an example method for processing data at a client device in accordance with various embodiments.

FIG. 7 is a flow diagram of an example method 700 for processing data at a client device, in accordance with various embodiments. The client device may comprise a mobile device (e.g., a cellular phone), a desktop device, or any other device that is communicatively coupled to the networked system 102. At operation 702, a galley view indicator is sent. In accordance with one embodiment, the user at the client device may select a button that indicates a desire to view items in a gallery view. The gallery view indicator is sent to one or more application servers associated with the networked system 102.

In response, formatted status information is received at operation 704. In example embodiments, the status information is formatted into gallery rendering and display instructions. The rendering and display instructions enables generation of status indicators from the status information for display over the image gallery at the client device. In some embodiments, the rendering and display instructions converts, or provides instructions to convert, the status information into status indicators (e.g., visually identifiable graphics) that represent the status information.

The rendering and display instructions may also include instructions for generating the image gallery on the client device at operation 706. The image galley may appear as a matrix of squares whereby each square is an image or thumbnail representing an item.

The status information is thus rendered into status indicators and displayed over the image gallery in operation 708. In one embodiment, the status indicator is rendered in a popover view over an image of an item associated with the status indicator. This embodiment may be utilized on displays that are generally larger (e.g., on a display device associated with a desktop computer). Thus, when a selection device (e.g., cursor of a mouse) is positioned over a particular image of the image gallery, then the status indicator (s) for the item depicted in the particular image are displayed in an expanded window over the particular image. In another embodiment, the status indicator is overlaid on an image of the image gallery containing the item to which the status indicator pertains. This embodiment may be used on a smaller display device (e.g., associated with a cellular phone). It should be noted that operation 706 and 708 may be combined into a single operation and occur substantially concurrently.

At operation 710, a determination is made as to whether the status should be updated. A status update may occur for several reasons. In one embodiment, a status update request may be sent from the client device. In another embodiment, an event may trigger an update to the status (e.g., an item searched for and not initially found gets posted overnight). In a further embodiment, the status module 406 may update status at a predetermined time (e.g., every five hours). If a status update is needed, then the method returns to operation 704 whereby the status information is received and subsequently processed.

Figure 8A:
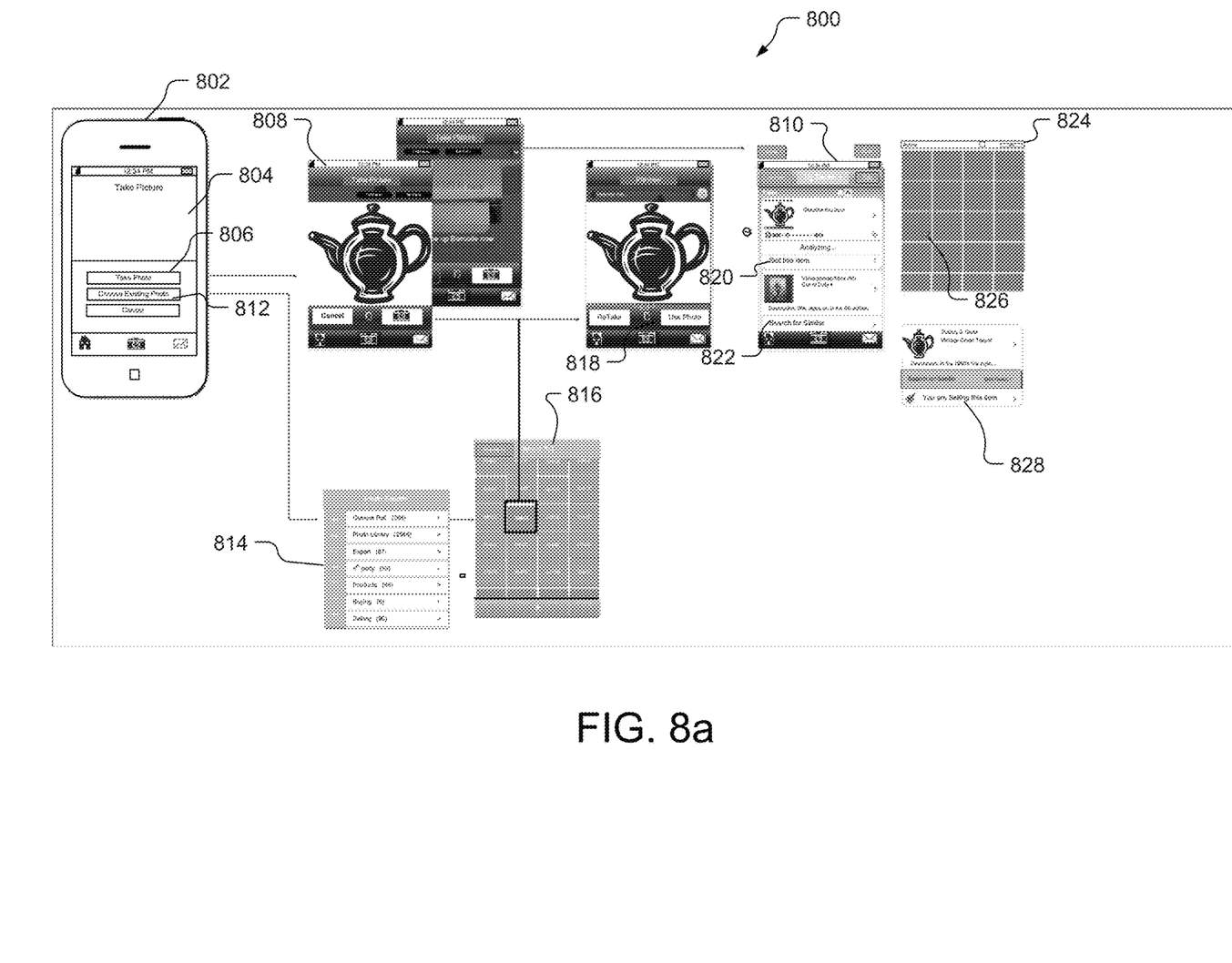
FIG. 8*a* is an example user interface illustrating a status indicator display method.
Figure 8B:
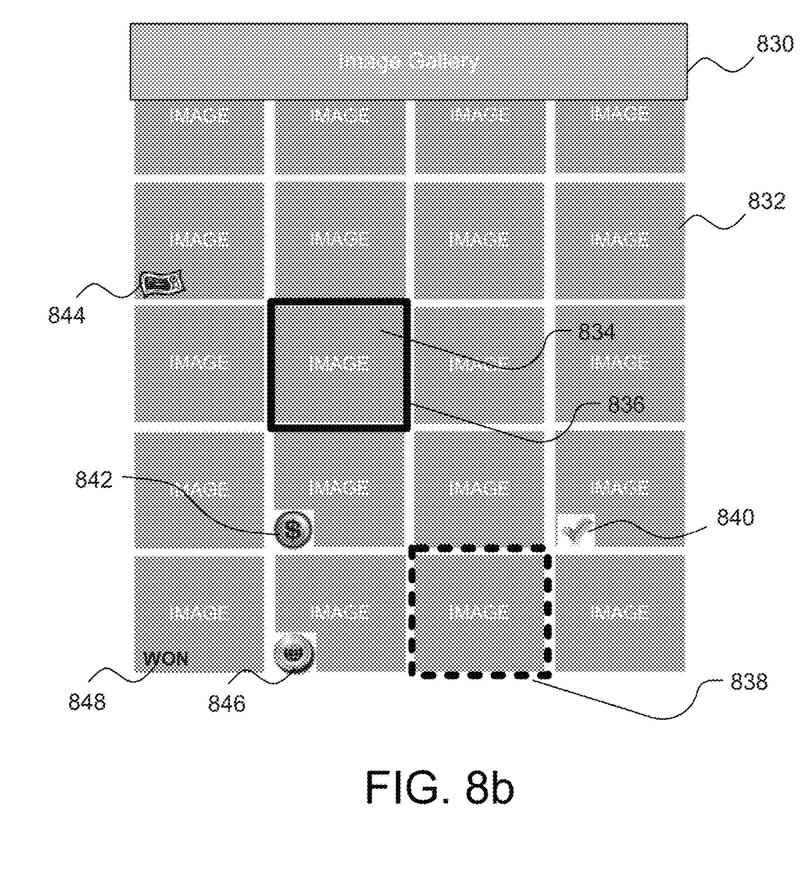
FIG. 8*b* is an example user interface illustrating an image gallery having status indicators.

FIG. 8a-FIG. 8b are example user interfaces illustrating the image galley and status indicator display method. FIG. 8a is a flow diagram illustrating a flow 800, according to an example embodiment, of user interfaces that may be presented to a user of a mobile device 802. The mobile device 802 comprises a display area interface 804. Using, for example, a "take photo" button 806 on the display area interface 804, a user may capture an image of an item or some other identifier a bar code) associated with the item using a camera coupled to (e.g., integrated with) the mobile device 802. A selection of the "take photo" button 806 invokes a "take a picture" interface 808, which flows to a "my shots" interface 810.

Alternatively, using a "choose existing photo" button 812, a user may select an image already stored within a memory of the mobile device 802. User selection of the "choose existing photo" button 812 invokes a flow through a series of selection interfaces 814-818, which flow to the "my shots" interface 810. The button 812 allows selection of a category from a photo albums stored or associated with the mobile device 802. The interface 816 allows selection of a single image for further processing. The interface 818 allows preview of the captured image (e.g., picture the camera took) or the selected image.

The "my shots" interface 810 indicates that the selected image is being analyzed by the networked system 102 (e.g., has been uploaded from the mobile device 802, and is being subject to an image recognition process). The "my shots" interface 810 may also present the user with an option of either transacting an item represented in the image (e.g., "sell this item" 820) or of searching for an item similar to the item depicted in the selected image (e.g., "search for similar" 822).

In conjunction with the "sell this item" option, a user may be presented with an option of providing further description pertaining to the item to be sold. To this end, the user may be presented with a template that is pre-populated with attribute data retrieved, at least partially, from other listings that include images depicting similar items. The user may provide supplement data to the pre-populated template and send the template back to the networked system 102.

An image gallery 824 may be presented. The image gallery 824 now includes an image of the item the user is selling. A status indicator illustrated as a green check mark 826 is shown overlaid over the image of the item indicating that the mobile device 802 recognizes the image (e.g., because the mobile device 802 took the picture of the image and the image is located in the photo album). Alternatively or in addition, selection of the image from the image gallery may present an interface 828 providing more details of the item. It should be noted that a popover view of an item of the image gallery may, in accordance with one embodiment, have an appearance similar to the interface 828.

FIG. 8*b* is an illustration of an example image gallery 830. As shown, the image gallery 830 comprises a matrix of individual images 832. Each image 832 represents an item associated with user. The items may be associated as being on a list associated with the user's account, as a result of a search query, or by any other relationship with the user.

Various status indicators are displayed over the image gallery 830 to graphically illustrate various examples. One image 834 comprises a colored border 836. Another image comprises a different colored border 838. The colored borders 836 and 838, depending on the specific color, may indicate various statuses. For example, a blue border around the image may indicate that user sold the item; a red border around an image may indicate that the user did not win the auction for the item in the image; a yellow border around an image may indicate that the user is watching the item. While colors are discussed, alternative embodiments may use any feature that will distinguish from border from another border.

The image gallery 830 also illustrates several examples of visually identifiable graphics. For example, a green check mark 840 indicates an item that is recognized by the client device (e.g., in a photo album of the client device); a dollar sign 842 indicates an item the user is selling; a coupon graphic 844 indicates the item is on sale, discounted, or is the deal of the day; a globe 846 indicates an item that may be locally purchased. Text (e.g., "won" 848) may also be used as a status indicator. It should be noted that any color border or visually identifiable graphic may be used to indicate any status associated with the item in the image.

The status indicator associated with a particular image within the image gallery 830 may be dynamically updated, based on information received from the networked system 102. The status updates reflect a change in the status or an activity event with respect to the item in the image. For example, the dollar sign 842 may be dynamically updated or replaced with a different status indicator to indicate that the item depicted in the image has in fact been sold in the event that an auction for the listing concludes with a winning bidder. It will be appreciated that any number of status indicators may be overlaid on the images included within the image gallery to indicate a number of status states and events pertaining to the item and its associated listing that is hosted by the networked system 102.

Modules, Components, and Logic

Additionally, certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in the dedicated and permanently configured circuitry, or in temporarily configured circuitry (e.g., configured by software) may be driven by, for example, cost, time, energy-usage, and package size considerations.

Accordingly, the term module should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Example Machine Architecture and Machine-Readable Medium

Figure 9:
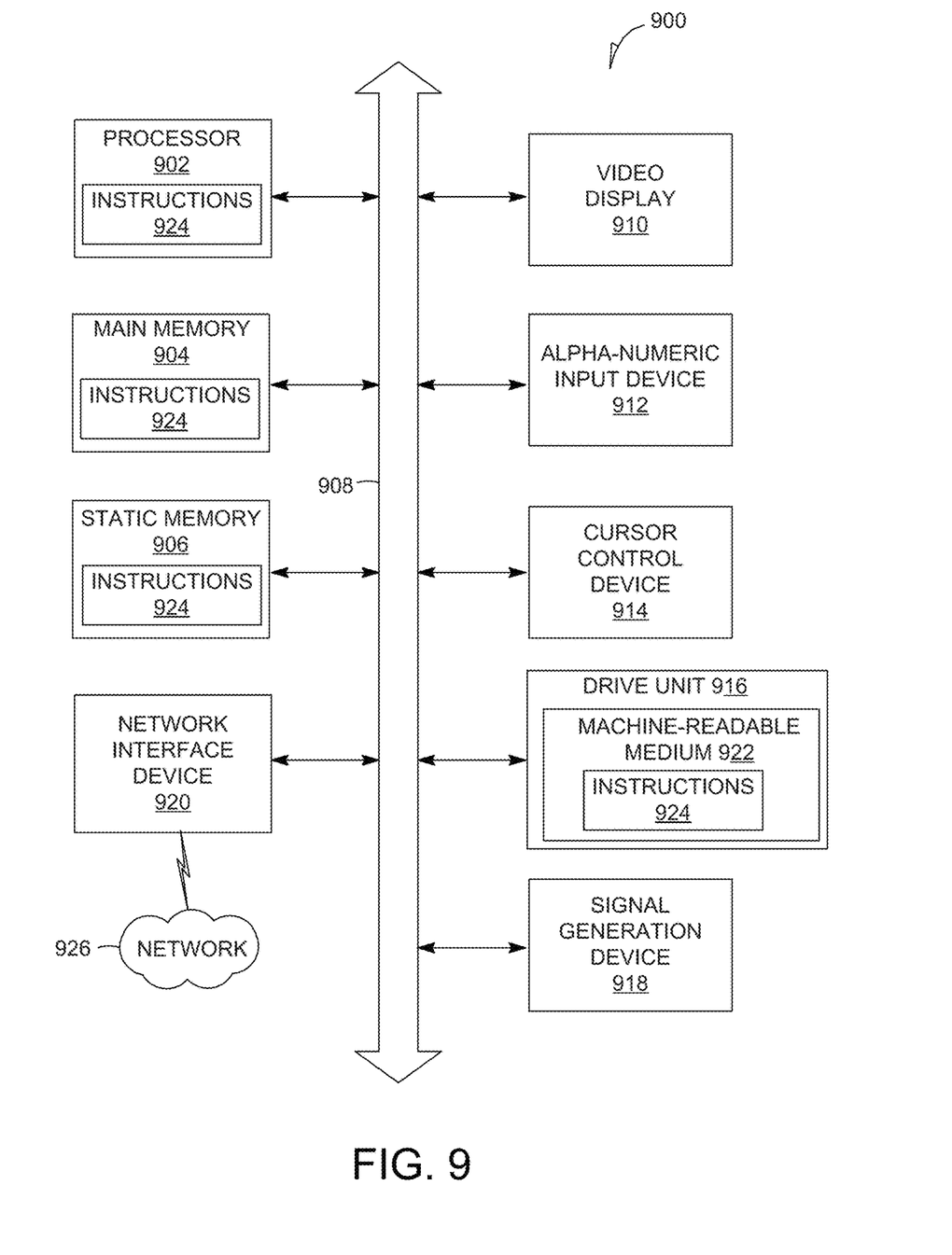
FIG. 9 is a simplified block diagram of a machine in an example form of a computing system within which a set of instructions for causing the machine to perform any one or more of the methodologies discussed herein may be executed.

With reference to FIG. 9, an example embodiment extends to a machine in the example form of a computer system 900 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a net (or multiple sets) of instructions to perform any one or more of the methodologies discussed herein.

The example computer system 900 may include a processor 902 (e.g., a central processing unit (CPU), a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). In example embodiments, the computer system 900 also includes one or more of an alpha-numeric input device 912 (e.g., a keyboard), a user interface (UI) navigation device or cursor control device 914 (e.g., a mouse), a disk drive unit 916, a signal generation device 918 (e.g., a speaker), and a network interface device 920.

Machine-Readable Medium

The disk drive unit 916 includes a machine-readable medium 922 on which is stored one or more sets of instructions 924 and data structures (e.g., software instructions) embodying or used by any one or more of the methodologies or functions described herein. The instructions 924 may also reside, completely or at least partially, within the main memory 904 or within the processor 902 during execution thereof by the computer system 900, the main memory 904 and the processor 902 also constituting machine-readable media.

While the machine-readable medium 922 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable medium" shall accordingly be taken to include, but not be limited to, solid-state memories and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

Transmission Medium

The instructions 924 may further be transmitted or received over a communications network 926 using a transmission medium via the network interface device 920 and utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
    receiving, from a client device an item query that includes an image that depicts an item, the image comprising image data;
    determining, at a server, one or more similar items to the item from a catalog of items associated with a network-based marketplace by comparing at least some of the image data to the respective attributes of the catalogue of items, each respective item in the catalog of items associated with a respective item listing of the network-based marketplace;

including, at the server, the determined one or more similar items to the item within an image gallery personalized to a user account associated with the network-based marketplace, wherein the image gallery comprises a plurality of images representing items and status information of the items;

determining, using the server, respective status information for each respective item of the determined one or more similar items that are included in the image gallery;

formatting, using the server, the respective status information for each respective item of the determined one or more similar items into gallery rendering and display instructions associated with rendering a respective status indicator for each respective item of the determined one or more similar items;

transmitting, using the server, the gallery rendering and display instructions to the client device effective to cause display of each respective status indicator over a respective image in the image gallery at the client device; and providing, using the server, additional gallery rendering and display instructions to the client device based, at least in part on a trigger event occurring in the network-based marketplace that affects at least one item included in the image gallery, the additional gallery rendering and display instructions configured to cause the client device to update one or more respective status indicators associated with the determined one or more items, the trigger event comprising identifying a new item associated with the item depicted by the image that is not included in the image gallery.

2. The method of claim 1, further comprising:
receiving an update request from the client device, the update request requesting status information updates associated with items included in the image gallery; and
forwarding, to the client device and in response to the update request, updated status indicators for each item included in the image gallery.

3. The method of claim 2, wherein said forwarding the updated status indicators further comprises forwarding the updated status indicators at a predetermined time.

4. The method of claim 1, wherein the gallery rendering and display instructions comprise instructions that cause the client device to render each respective status indicator in a popover view of the image gallery.

5. The method of claim 1, wherein the gallery rendering and display instructions comprise instructions that cause the client device to visually overlay each respective status indicator on the respective item image in the image gallery that is associated with the status indicator.

6. The method of claim 1, wherein said determining the one or more items to include in the image gallery further comprises accessing one or more item lists associated with the user account.

7. The method of claim 1, wherein said determining the one or more similar items to include in an image gallery further comprises accessing a dynamic catalog of items that adds new items to the catalog of items as the new items are listed in the network-based marketplace.

8. A system comprising:
one or more processors; and
a memory storing instructions that, responsive to execution by the one or more processors, cause the system to perform operations comprising:
receiving, from a client device, an item query that includes an image that depicts an item, the image comprising image data;
determining, using the system, one or more similar items to the item from a catalog of items associated with a network-based marketplace by comparing at least some of the image data to the respective attributes of the catalogue of items, each respective item in the catalog of items associated with a respective item listing of the network-based marketplace;
including, using the system, the determined one or more similar items to the item within an image gallery personalized to a user account associated with the network-based marketplace, wherein the image gallery comprises a plurality of images representing items and status information of the items;
determining, using the system, respective status information for each respective item of the determined one or more similar items that are included in the image gallery;
formatting, using the system, the respective status information for each respective item of the determined one or more similar items into gallery rendering and display instructions associated with rendering a respective status indicator for each respective item of the determined one or more similar items;
transmitting, using the system, the gallery rendering and display instructions to the client device effective to cause display of each respective status indicator over a respective image in the image gallery at the client device; and
providing, using the system, additional gallery rendering and display instructions to the client device based, at least in part on a trigger event occurring in the network-based marketplace that affects at least one item included in the image gallery, the additional gallery rendering and display instructions configured to cause the client device to update one or more respective status indicators associated with the determined one or more items, the trigger event comprising identifying a new item associated with the item depicted by the image that is not included in the image gallery.

9. The system of claim 8, wherein the operations further comprise:
receiving an update request from the client device, the update request requesting status information updates associated with items included in the image gallery; and
forwarding, to the client device and in response to the update request, updated status indicators for each item included in the image gallery.

10. The system of claim 9, wherein said forwarding the updated status indicators further comprises forwarding the updated status indicators at a predetermined time.

11. The system of claim 8, wherein the gallery rendering and display instructions comprise instructions that cause the client device to render each respective status indicator in a popover view of the image gallery.

12. The system of claim 8, wherein the gallery rendering and display instructions comprise instructions that cause the client device to visually overlay each respective status indicator on the respective item image in the image gallery that is associated with the status indicator.

13. The system of claim 8, wherein said determining the one or more items to include in the image gallery comprises accessing one or more item lists associated with the user account.

14. The system of claim 8, wherein the respective status information comprises at least one of:
   an indication associated with a current availability of the respective item;
   an indication of whether the respective item has an association with a user;
   an indication of a number of bids associated with the respective item;
   an indication that the respective item requires feedback; or
   an indication of whether the respective item is in stock at a location associated with the user.

15. A non-transitory machine-readable storage medium in communication with a processor, the machine-readable storage medium storing instructions which, responsive to execution by the processor, perform operations comprising:
   receiving, from a client device, an item query that includes an image that depicts an item, the image comprising image data;
   determining one or more similar items to the item from a catalog of items associated with a network-based marketplace by comparing at least some of the image data to the respective attributes of the catalogue of items, each respective item in the catalog of items associated with a respective item listing of the network-based marketplace;
   including the determined one or more similar items to the item within an image gallery personalized to a user account associated with the network-based marketplace, wherein the image gallery comprises a plurality of images representing items and status information of the items;
   determining respective status information for each respective item of the determined one or more similar items that are included in the image gallery;
   formatting the respective status information for each respective item of the determined one or more similar items into gallery rendering and display instructions associated with rendering a respective status indicator for each respective item of the determined one or more similar items;
   transmitting the gallery rendering and display instructions to the client device effective to cause display of each respective status indicator over a respective image in the image gallery at the client device; and
   providing additional gallery rendering and display instructions to the client device based, at least in part on a trigger event occurring in the network-based marketplace that affects at least one item included in the image gallery, the additional gallery rendering and display instructions configured to cause the client device to update one or more respective status indicators associated with the determined one or more items, the trigger event comprising identifying a new item associated with the item depicted by the image that is not included in the image gallery.

16. The non-transitory machine-readable storage medium of claim 15, wherein the operations further comprise:
   receiving an update request from the client device, the update request requesting status information updates associated with items included in the image gallery; and
   forwarding, to the client device and in response to the update request, updated status indicators for each item included in the image gallery.

17. The non-transitory machine-readable storage medium of claim 16, wherein said forwarding the updated status indicators further comprises forwarding the updated status indicators at a predetermined time.

18. The non-transitory machine-readable storage medium of claim 15, wherein the gallery rendering and display instructions comprise instructions that cause the client device to render reach respective status indicator in a pop-over view of the image gallery.

19. The non-transitory machine-readable storage medium of claim 15, wherein the gallery rendering and display instructions comprise instructions that cause the client device to visually overlay each respective status indicator on the respective item image in the image gallery that is associated with the status indicator.

20. The non-transitory machine-readable storage medium of claim 15, wherein said gallery rendering and display instructions further comprise instructions to convert the respective status information into one or more visually identifiable graphics.

* * * * *

UNITED STATES PATENT AND TRADEMARK OFFICE
CERTIFICATE OF CORRECTION

PATENT NO. : 10,169,801 B2
APPLICATION NO. : 15/210415
DATED : January 1, 2019
INVENTOR(S) : Ryan Melcher et al.

Page 1 of 1

It is certified that error appears in the above-identified patent and that said Letters Patent is hereby corrected as shown below:

On the Title Page

Item (74), in Column 2, in "Attorney, Agent, or Firm", Line 1, delete "Wolfe-SMBC" and insert -- Wolfe-SBMC --, therefor.

In the Claims

In Column 18, Line 33, in Claim 18, delete "reach" and insert -- each --, therefor.

Signed and Sealed this
Twenty-first Day of July, 2020

Andrei Iancu
*Director of the United States Patent and Trademark Office*